(12) United States Patent
Zhou et al.

(10) Patent No.: US 9,710,718 B2
(45) Date of Patent: Jul. 18, 2017

(54) LIVENESS AUTHENTICATION METHOD AND APPARATUS

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Shuchang Zhou, Beijing (CN); Chi Zhang, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 100 days.

(21) Appl. No.: 14/930,232

(22) Filed: Nov. 2, 2015

(65) Prior Publication Data

US 2016/0320238 A1 Nov. 3, 2016

(30) Foreign Application Priority Data

Apr. 29, 2015 (CN) .......................... 2015 1 0214244

(51) Int. Cl.
*G06K 9/00* (2006.01)
*G06K 9/20* (2006.01)
(Continued)

(52) U.S. Cl.
CPC ............ *G06K 9/00906* (2013.01); *G01J 4/00* (2013.01); *G06K 9/0012* (2013.01);
(Continued)

(58) Field of Classification Search
CPC .. G01J 4/00; G01J 2004/001; G01J 2004/002; G01J 4/02; G01J 4/04;
(Continued)

(56) References Cited

U.S. PATENT DOCUMENTS

| | | | |
|---|---|---|---|
| 6,292,576 B1 * | 9/2001 | Brownlee | G06K 9/00013 340/5.83 |
| 7,539,330 B2 * | 5/2009 | Rowe | G06K 9/00046 340/5.53 |

(Continued)

*Primary Examiner* — Gordon J Stock, Jr.
(74) *Attorney, Agent, or Firm* — Hamre, Schumann, Mueller & Larson, P.C.

(57) ABSTRACT

Provided are a liveness authentication method and apparatus, which perform liveness authentication by determining whether incident light is linear polarized light. The liveness authentication method comprises: making incident light incident to a set of polarizing filters not overlapped with each other in a light transmission direction; detecting, for each of the set of polarizing filters, an intensity of light transmitting through the polarizing filter, so as to obtain a set of light intensities corresponding to respective polarizing filters of the set of polarizing filters respectively; and determining that the liveness authentication is failed in the case that the set of light intensities satisfy a predetermined condition. In the case that the incident light is light emitted from a liquid crystal display screen, the incident light is the linear polarized light, and thus the liveness authentication is failed.

20 Claims, 6 Drawing Sheets

(51) Int. Cl.
*G01J 4/00* (2006.01)
*G06K 9/46* (2006.01)

(52) U.S. Cl.
CPC ..... *G06K 9/00255* (2013.01); *G06K 9/00288* (2013.01); *G06K 9/2036* (2013.01); *G06K 9/4661* (2013.01)

(58) Field of Classification Search
CPC ........... G06K 9/00255; G06K 9/00268; G06K 9/00275; G06K 9/00281; G06K 9/00288; G06K 9/00295; G06K 9/00302; G06K 9/00308; G06K 9/00315; G06K 9/00335; G06K 9/00342; G06K 9/00348; G06K 9/00355; G06K 9/00362; G06K 9/00369; G06K 9/00375; G06K 9/00382; G06K 9/00389; G06K 9/00107; G06K 9/00114; G06K 9/0012; G06K 9/00899; G06K 9/00906; F21V 9/14; G01N 21/21; G01N 21/211; G01N 2021/216; G01N 2021/217
See application file for complete search history.

(56) References Cited

U.S. PATENT DOCUMENTS

| | | | |
|---|---|---|---|
| 7,587,071 B2* | 9/2009 | Einighammer | G06K 9/00899 356/71 |
| 7,668,350 B2* | 2/2010 | Rowe | G06K 9/00046 340/5.53 |
| 7,801,339 B2* | 9/2010 | Sidlauskas | G06K 9/0012 340/5.53 |
| 7,995,808 B2* | 8/2011 | Rowe | G06K 9/00033 382/124 |
| 8,175,346 B2* | 5/2012 | Rowe | G06K 9/00013 340/5.53 |
| 9,436,864 B2* | 9/2016 | Gozzini | |

\* cited by examiner

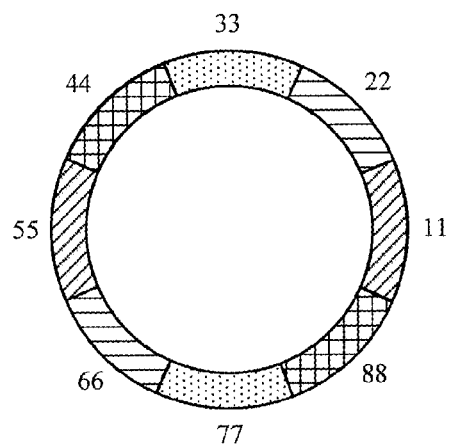
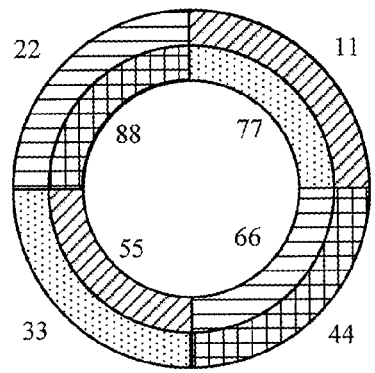
Fig. 5A
Fig. 5B
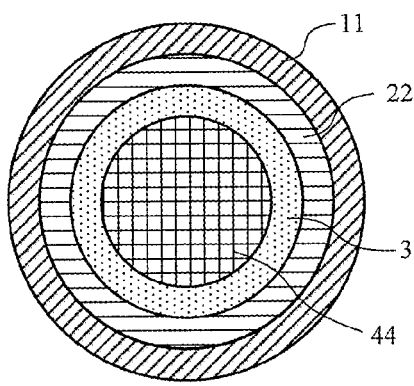
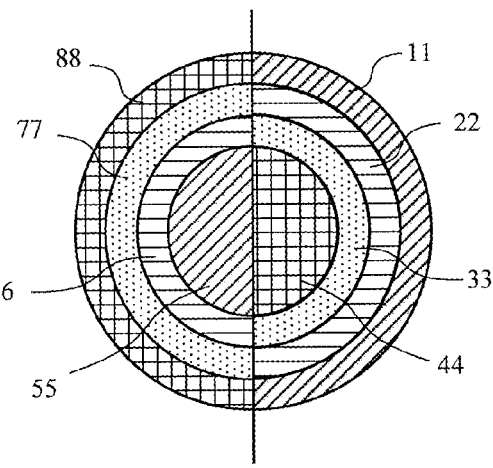
Fig. 5C
Fig. 5D
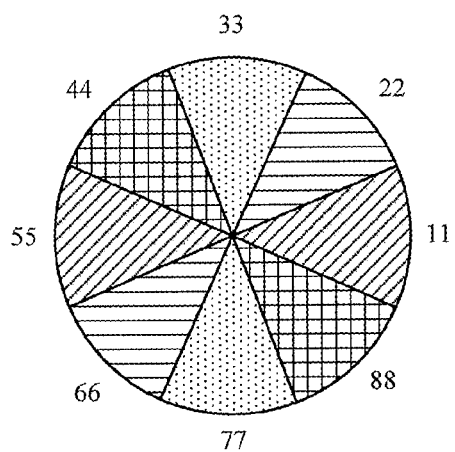
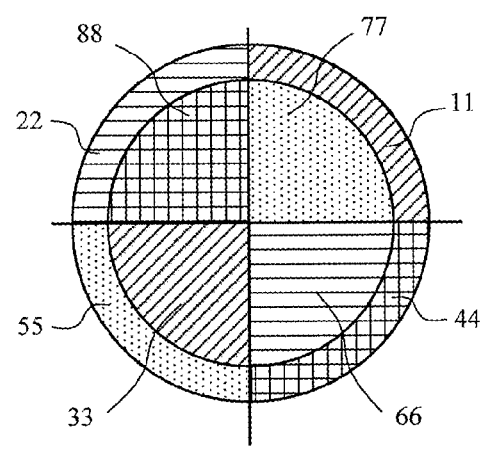
Fig. 6A
Fig. 6B

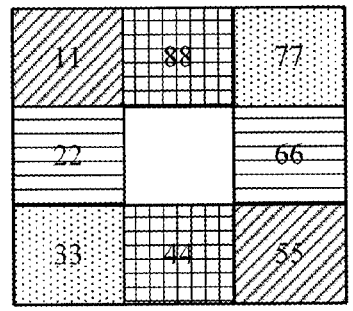
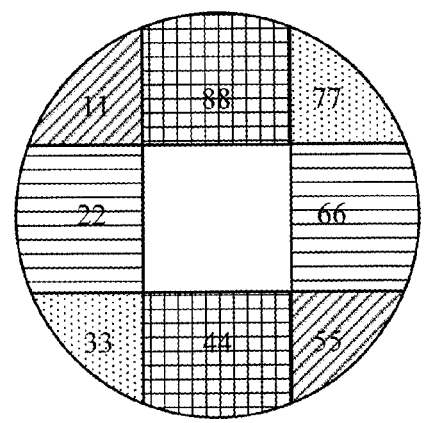
Fig. 7A                     Fig. 7B
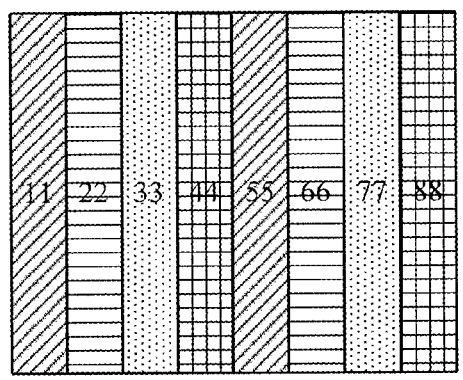
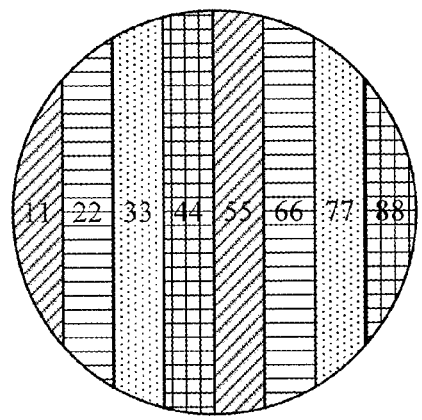
Fig. 7C                     Fig. 7D
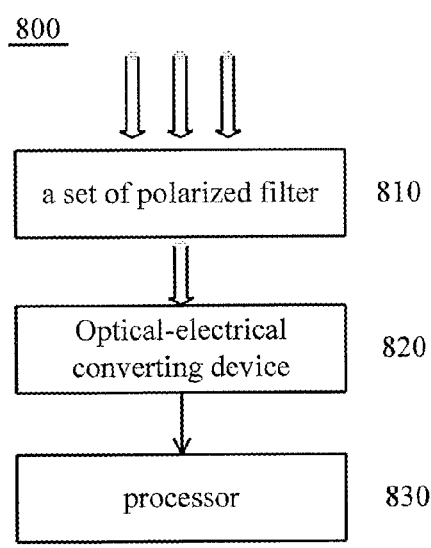
Fig. 8

LIVENESS AUTHENTICATION METHOD AND APPARATUS

TECHNICAL FIELD

The present disclosure relates to a technical field of liveness authentication of human face recognition, in particular to a liveness authentication method and apparatus.

BACKGROUND

At present, an identity authentication system based on human face has been applied widely. With a promotion of the identity authentication system based on human face, some methods that maliciously attack the identity authentication based on human face have been already derived.

In the most original identity authentication system based on human face, identity authentication is performed based on comparison between a human face image currently photographed and a human face image pre-stored. However, when a photo of a person being counterfeited is placed before a camera in an identity authentication system based on comparison of human face images, such identity authentication system can pass a user identity authentication. In other words, a malicious user can use the photo of the person being counterfeited to make a malicious attack (i.e., photo attack). Such identity authentication system is incapable of resisting the photo attack.

With respect to the above photo attack, the identity authentication system based on comparison of human face images has been already improved. In an improved identity authentication system based on human face, the above photo attack is handled effectively through checking whether there is a fine action on the human face. Further, the user can be required to perform a designated action, so as to strengthen the anti-attack capability of the identity authentication system based on human face.

However, a malicious user may still utilize a tablet computer, a smart terminal and the like to play a video or a flash to imitate the human face action of the person being counterfeited, and makes a malicious attack (i.e., flash attack) on such a basis. A video or a flash that counterfeits the human face actions of the person being counterfeited may be synthesized from images of the person being counterfeited which are obtained by means of various measures by the attacker, or may be real videos of the person being counterfeited. As a result, such video or flash is greatly deceptive. Sometimes, it is difficult for the identity authentication system based on human face to deal with such flash attack.

Therefore, there is a need for a method and apparatus for performing liveness authentication in human face recognition.

TECHNICAL FIELD

In view of the above problem, the present disclosure is proposed to provide a liveness authentication method and apparatus, which performs liveness authentication by determining whether incident light is linear polarized light. In the case that the incident light is light emitted from a liquid crystal display screen, the incident light is the linear polarized light, and thus the liveness authentication is failed. In the case that the incident light is light produced by the human face reflecting natural lights, the incident light is circular polarized light, and thus the liveness authentication is passed.

According to one aspect of the present disclosure, there is provided a liveness authentication method, comprising: making incident light incident to a set of polarizing filters not overlapped with each other in a light transmission direction; for each of the set of polarizing filters, detecting an intensity of light transmitting through the polarizing filter, so as to obtain a set of light intensities corresponding to respective polarizing filters of the set of polarizing filters respectively; and determining that the liveness authentication is failed in the case that the set of light intensities satisfy a predetermined condition.

According to another aspect of the present disclosure, there is provided a liveness authentication apparatus, comprising: a set of polarizing filters configured to receive incident light, wherein the set of polarizing filters are not overlapped with each other in a light transmission direction; an optical-electrical converting device configured to, for each of the set of polarizing filters, convert light transmitting through the polarizing filter into an electrical signal; and a processor configured to determine, for each of the set of polarizing filters, the intensity of the light transmitting through the polarizing filter according to the electrical signal corresponding to the polarizing filter, so as to obtain a set of light intensities corresponding to respective polarizing filters of the set of polarizing filters respectively, and determine that the liveness authentication is failed in the case that it is determined that the set of light intensities satisfy a predetermined condition.

According to another aspect of the present disclosure, there is provided a liveness authentication apparatus, comprising: a set of polarizing filters configured to receive incident light, wherein the set of polarizing filters are not overlapped with each other in a light transmission direction; an optical-electrical converting device configured to, for each of the set of polarizing filters, convert light transmitting through the polarizing filter into an electrical signal; a storage; and computer program instructions stored in the storage, as executed by the processor, the computer program instructions performing the following steps: determining, for each of the set of polarizing filters, an intensity of the light transmitting through the polarizing filter according to the electrical signal corresponding to the polarizing filter, so as to obtain a set of light intensities corresponding to respective polarizing filters of the set of polarizing filters respectively, and determining that the liveness authentication is failed in the case that it is determined the set of light intensities satisfy a predetermined condition.

According to another aspect of the present disclosure, there is provided a computer program product for performing liveness authentication, comprising a computer readable storage medium on which computer program instructions are stored, wherein as executed by a processor, the computer program instructions make the processor: determine, for each of the set of polarizing filters, an intensity of the light transmitting through the polarizing filter according to the electrical signal produced based on the light transmitting through the polarizing filter, so as to obtain a set of light intensities corresponding to respective polarizing filters of the set of polarizing filters respectively; and determine that the liveness authentication is failed in the case that it is determined the set of light intensities satisfy a predetermined condition The liveness authentication method and apparatus according to the embodiments of the present disclosure determine that the liveness authentication is failed in the case that it is determined the incident light is the linear polarized light. In this case, even if the human face photo used for an attack is completely the same as the human face image pre-stored or the human face flash used for an attack is completely the same as the human face action required, this attack can be detected effectively only if the human face photo or the human face flash used for the attack is played by using a liquid crystal display screen, so as to raise anti-attack capability of the identity recognition system based on human face.

BRIEF DESCRIPTION OF THE DRAWINGS

Embodiments of the present disclosure would be described in detail by combining with the accompanying drawings, and the above and other purposes, characteristics and advantages of the present disclosure would become more evident. The figures are used to provide further understanding of the embodiments of the present disclosure, form a part of the specification, and are used to explain the present disclosure together with the embodiments of the present disclosure, but do not form a limitation to the present disclosure. In the drawings, the same reference marks generally represent the same means or steps.

FIGS. 5A-5D are another four exemplary layout diagrams of a set of polarizing filters comprising 8 polarizing filters according to an embodiment of the present disclosure;

FIGS. 6A-6B are another two exemplary layout diagrams of a set of polarizing filters comprising 8 polarizing filters according to an embodiment of the present disclosure;

FIGS. 7A-7D are another four exemplary layout diagrams of a set of polarizing filters comprising 8 polarizing filters according to an embodiment of the present disclosure;

FIG. 8 is a schematic structure diagram of a liveness authentication apparatus according to an embodiment of the present disclosure;

DETAILED DESCRIPTION

In order to make purposes, technical solutions and advantages of the present disclosure more evident, exemplary embodiments according to the present disclosure would be described in detail by referring to the accompanying drawings. Obviously, the embodiments described below are just a part of embodiments of the present disclosure rather than all the embodiments of the present disclosure. It shall be understood that the present disclosure is not limited by the exemplary embodiments described below. Based on the embodiments of the present disclosure described below, all the other embodiments obtained by those skilled in the art without paying any inventive labor shall be deemed as falling into the protection scope of the present disclosure.

Figure 1:
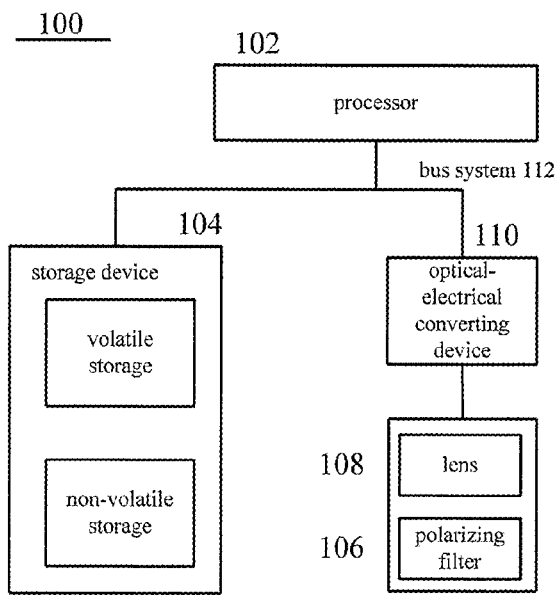
FIG. 1 is a schematic block diagram of a liveness authentication apparatus used to implement embodiments of the present disclosure.

First, a block diagram which can be used to implement an exemplary liveness authentication apparatus according to an embodiment of the present disclosure would be described by referring to FIG. 1.

As shown in FIG. 1, a liveness authentication apparatus 100 comprises one or more processors 102, a storage device 104, one or more filtering devices 106, and one or more optical-electrical converting devices 110. These components are connected to each other through a bus system 112 and/or other forms of connecting mechanism (not shown in the figure). It shall be noted that components and structure of the liveness authentication apparatus 100 as shown in FIG. 1 are just for illustration, but not for limitation. The liveness authentication 100 may also have other components and structures according to requirements.

In addition, as shown in FIG. 1, the liveness authentication apparatus 100 can further comprise one or more lenses 108.

The processor 102 can be a central processing unit (CPU) or other forms of processing units having capabilities of data processing and/or instruction execution.

The storage device 104 can comprise one or more computer program products. The computer program product can comprise various forms of computer readable storage medium, for example, a volatile storage and/or a non-volatile storage. The volatile storage can for example comprise a random access memory (RAM) and/or a cache memory and the like. The non-volatile storage can for example comprise a read-only memory (ROM), hard disk, and a flash memory and the like. One or more computer program instructions can be stored on the computer readable storage medium. The processor 102 can execute the program instructions, so as to realize functions (realized by the processor) in the embodiments of the present disclosure described below or other desirable functions. Various application programs and various data can be stored in the computer readable storage medium, for example, human face data, various data used and/or produced by the application programs and so on.

Operations of the processor 102, the filtering device 106, the lens 108, and the optical-electrical converting device 110 in the liveness authentication apparatus 100 according to the embodiment of the present disclosure would be described in detail below.

Figure 2:
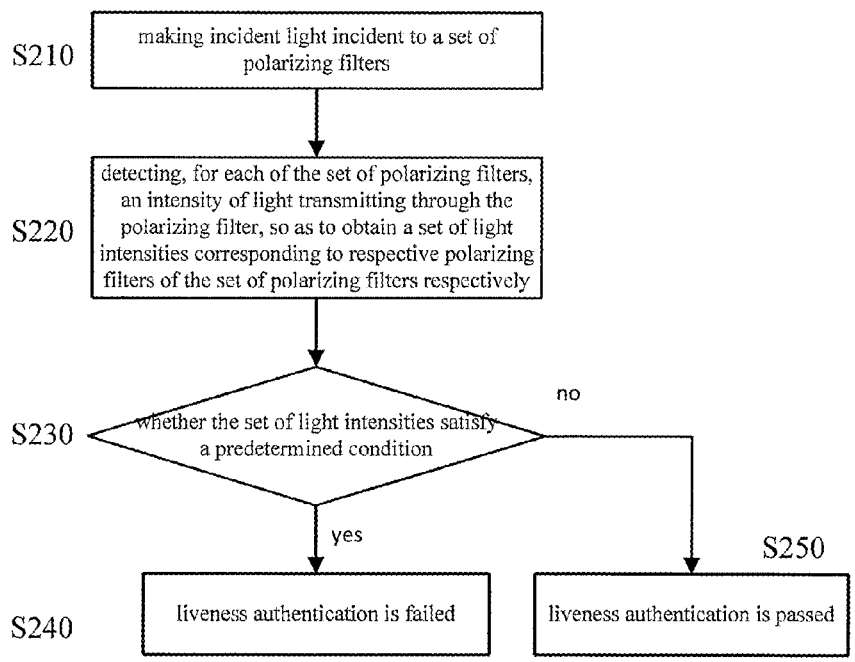
FIG. 2 is a schematic flowchart of a liveness authentication method according to an embodiment of the present disclosure.

FIG. 2 is a schematic flow chart of a liveness authentication method 200 according to an embodiment of the present disclosure.

In step S210, incident light is incident to a set of polarizing filters, the set of polarizing filters are not overlapped with each other in a light transmission direction.

As an example, the set of polarizing filters can correspond to at least two different polarization directions, and can comprise at least two polarizing filters. In particular, for example, the set of polarizing filters can comprise a first polarizing filter and a second polarizing filter. A polarization direction of the first polarizing filter is a first polarization direction, and a polarization direction of the second polarizing filter is a second polarization direction. The first polarization direction and the second polarization direction can have an angle difference for example 30°, 45°, 60°, 90°, etc.

Further, in order to improve accuracy of the liveness authentication method according to the embodiment of the present disclosure, the set of polarizing filters can correspond to at least three different polarization directions, and can comprise at least three polarizing filters. In particular, for example, the set of polarizing filters can comprise a first polarizing filter, a second polarizing filter and a third polarizing filter. A polarization direction of the first polarizing filter is a first polarization direction, a polarization direction of the second polarizing filter is a second polarization direction, and a polarization direction of the third polarizing filter is a third polarization direction. For example, the first polarization direction, the second polarization direction and the third polarization direction can have an angle difference of for example 30°, 45°, 60°, 90°, etc. from each other in order. In a specific implementation, the first polarization direction is perpendicular to the third polarization direction, the first polarization direction and the second polarization direction have an angle difference of 45°, and the second polarization direction and the third polarization direction have an angle difference of 45°.

In step S220, for each of the set of polarizing filters, an intensity of light transmitting through the polarizing filter is detected, so as to obtain a set of light intensities corresponding to respective polarizing filters of the set of polarizing filters respectively.

In particular, for each of the set of polarizing filters, the intensity of the light transmitting through the polarizing filter is detected. In the case that the set of polarizing filters comprise at least two polarizing filters, at least two light intensities corresponding to the at least two polarizing filters respectively can be obtained.

In step S230, it is determined whether the set of light intensities satisfy a predetermined condition.

In the case that it is determined in step S230 that the set of light intensities satisfy the predetermined condition, it is determined in step S240 that the liveness authentication is failed. Otherwise, in the case that it is determined in step S230 that the set of light intensities do not satisfy the predetermined condition, it is determined in step S250 that the liveness authentication is passed.

As an example, in step S230, a maximum value and a minimum value of the set of light intensities can be determined, and in the case that a proportion of the minimum value and the maximum value is smaller than a first predetermined threshold, it is determined that the liveness authentication is failed. The first predetermined threshold is smaller than 1, and for example, the value of the first predetermined threshold may be within a range of 0.5-0.8. The first predetermined threshold can be determined according to experiments.

Alternatively, in step S230, the maximum value and the minimum value of the set of light intensities can be determined, and a difference between the maximum value and the minimum value is calculated. In the case that a proportion of the difference and the maximum value is greater than a second predetermined threshold, it is determined that the liveness authentication is failed. The second predetermined threshold is smaller than 1, and for example, the value of the second predetermined threshold may be within a range of 0.2-0.5. The second predetermined threshold can be determined according to experiments.

For example, there are n polarizing filters. $x_i$ is the intensity of the light transmitting through an $i^{th}$ polarizing filter, $\alpha$ is the first predetermined threshold, and $\beta$ is the second predetermined threshold. In step S230, it can be determined whether the set of light intensities satisfy the predetermined condition according to following formulas (1) or (2).

$$\frac{\max(x_1, \ldots, x_n) - \min(x_1, \ldots, x_n)}{\max(x_1, \ldots, x_n)} > \alpha \qquad (1)$$

$$\frac{\min(x_1, \ldots, x_n)}{\max(x_1, \ldots, x_n)} < \beta \qquad (2)$$

Based on a basic principle of liquid crystal display, light emitted from a liquid crystal display screen is linear polarized light. In contrast to this, light sources such as indoor and outdoor lighting and outdoor sunlight and moonlight and so on are circular polarized light.

For the circular polarized light emitted from light sources such as indoor and outdoor lighting and outdoor sunlight and moonlight and so on, when the incident light illuminates the respective polarizing filters of the set of polarizing filters, the intensities of light transmitting through the respective polarizing filters is roughly the same. However, for the linear polarized light emitted from the liquid crystal display screen, when the incident light illuminates the respective polarizing filters of the set of polarizing filters, the intensities of light transmitting through the respective polarizing filters are different. Thus, it can be determined whether the incident light is the linear polarized light according to the detected intensities of light penetrating the respective polarizing filters.

In other words, the liveness authentication method according to the embodiment of the present disclosure determines in step S230 whether the incident light is the linear polarized light according to the obtained set of light intensities. In the case that it is determined in step S230 that the incident light is the linear polarized light, it is determined that the liveness authentication is failed; otherwise, in the case that it is determined in step S230 that the incident light is not the linear polarized light, it is determined that the liveness authentication is passed.

It shall be known that, according to the embodiment of the present disclosure, even if the liveness authentication is passed, it does not mean that there is certainly a liveness. For example, in the case that there is no liveness and there is no display from the liquid crystal display screen, it is also determined in step S230 that the incident light is not the linear polarized light, and it is also determined in step S250 that the liveness authentication is passed. Therefore, the liveness authentication method according to the embodiment of the present disclosure is just one aspect of performing liveness authentication in the human face recognition system, and aims at resisting the attack from the photo display, video display or flash display from the liquid crystal display screen.

The liveness authentication method according to the embodiment of the present disclosure can be used independently, or can be used simultaneously with other liveness authentication methods.

Figure 3:
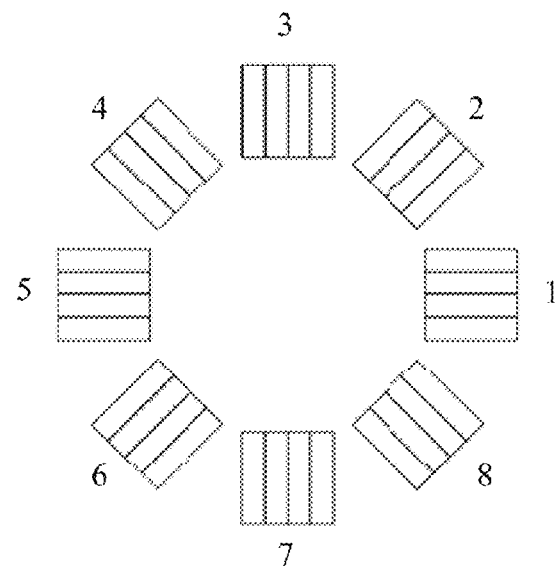
FIG. 3 is a schematic layout diagram of a set of polarizing filters comprising 8 polarizing filters according to an embodiment of the present disclosure.

FIG. 3 is a schematic layout diagram of a set of polarizing filters comprising 8 polarizing filters according to an embodiment of the present disclosure. FIG. 3 not only shows the schematic layout diagram of the set of polarizing filters but also shows polarization direction of respective polarizing filters of the set of polarizing filters. As shown in FIG. 3, polarization directions of a first polarizing filter 1 and a fifth polarizing 5 filter are basically the same and are basically a horizontal polarization direction, polarization directions of a second polarizing filter 2 and a sixth polarizing filter 6 are basically the same and are basically a polarization direction of 45° in a first quadrant which is obtained after rotating 45° counter clockwise with respect to a horizontal direction, polarization directions of a third polarizing filter 3 and a seventh polarizing filter 7 are basically the same and are basically a vertical polarization direction, and polarization directions of a fourth polarizing filter 4 and an eighth polarizing filter 8 are basically the same and are basically a polarization direction of 45° in a fourth quadrant which is obtained after rotating 45° clockwise with respect to the horizontal direction.

Figures 4A, 4B:
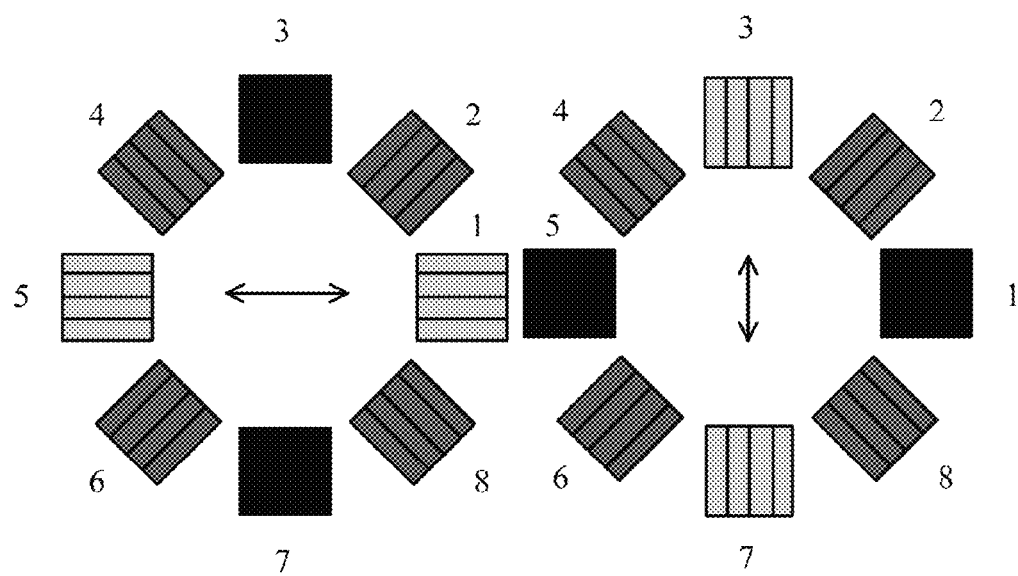
FIG. 4A is brightness of linear polarized light with a horizontal polarization direction after transmitting through 8 polarizing filters as shown in FIG. 3.
FIG. 4B is brightness of linear polarized light with a vertical polarization direction after transmitting through 8 polarizing filters as shown in FIG. 3.

FIG. 4A is brightness (i.e., light intensity) of linear polarized light with a horizontal polarization direction after transmitting through 8 polarizing filters as shown in FIG. 3; FIG. 4B is brightness (i.e., light intensity) of linear polarized light with a vertical polarization direction after transmitting through 8 polarizing filters as shown in FIG. 3.

In FIGS. 4A and 4B, the deeper the color is, the lower the brightness is, that is, the deeper the color is, the lower the light intensity is.

As shown in FIG. 4A, light obtained after the linear polarized light with the horizontal polarization direction transmits through the first and fifth polarizing filters 1 and 5 has a strongest light intensity, light obtained after the linear polarized light with the horizontal polarization direction transmits through the second and sixth polarizing filters 2 and 6 and the fourth and eighth polarizing filters 4 and 8 has a middle light intensity, and light obtained after the linear polarized light with the horizontal polarization direction transmits through the third and seventh polarizing filters 3 and 7 has a weakest light intensity.

As shown in FIG. 4B, light obtained after the linear polarized light with the vertical polarization direction transmits through the first and fifth polarizing filters 1 an 5 has a weakest light intensity, light obtained after the linear polarized light with the vertical polarization direction transmits through the second and sixth polarizing filters 2 and 6 and the fourth and eighth polarizing filters 4 and 8 has a middle light intensity, and light obtained after the linear polarized light with the vertical polarization direction transmits through the third and seventh polarizing filters 3 and 7 has a strongest light intensity.

It shall be understood that the embodiment of the present disclosure is not limited to the number and layout of the polarizing filters as shown in FIG. 3. In order to reduce the cost and complexity, it can comprise less polarizing filters. In order to reduce the false alarm rate due to shadow, illumination change and human face makeup and so on, the set of polarizing filters can comprise more polarizing filters.

According to the embodiment of the present disclosure, besides the layout as shown in FIG. 3, the set of polarizing filters can have other forms of layout.

FIGS. 5A-5D are another four exemplary layout diagrams of a set of polarizing filters comprising 8 polarizing filters according to an embodiment of the present disclosure.

According to the embodiment of the present disclosure, as shown in FIGS. 5A-5D, the set of polarizing filters can be arranged as a ring shape structure. This ring shape structure can comprise at least one ring, and each polarizing filter is composed of at least one of the ring shape structure. Preferably, each polarizing filter has basically same area.

FIGS. 6A-6B are another two exemplary layout diagrams of a set of polarizing filters comprising 8 polarizing filters according to an embodiment of the present disclosure.

According to the embodiment of the present disclosure, as shown in FIG. 6A, each of the set of polarizing filters can be arranged as a fan shape. As shown in FIG. 6B, respective polarizing filters of the set of polarizing filters can be arranged by combining the ring shape and the fan shape. Preferably, each polarizing filter has basically same area.

FIGS. 7A-7D are another four exemplary layout diagrams of a set of polarizing filters comprising 8 polarizing filters according to an embodiment of the present disclosure According to the embodiment of the present disclosure, as shown in FIGS. 7A-7B, respective polarizing filters of the set of polarizing filters can be arranged as a matrix form. As shown in FIGS. 7C-7D, each of the set of polarizing filters can be arranged as a rectangle. Preferably, each polarizing filter has basically same area.

Although the set of polarizing filters in FIGS. 3, 5A-5D, 6A-6D and 7A-7D comprises 8 polarizing filters, the set of polarizing filters according to the embodiment of the present disclosure do not have to comprise the 8 polarizing filters simultaneously.

As an example, according to the embodiment of the present disclosure, the set of polarizing filters can comprise first polarizing filters 1 and 11, second polarizing filters 2 and 22, and third polarizing filters 3 and 33. A polarization direction of the first polarizing filters 1 and 11 is a first polarization direction (horizontal direction), a polarization direction of the second polarizing filters 2 and 22 is a second polarization direction (45° direction), and a polarization direction of the third polarizing filters 3 and 33 is a third polarization direction (vertical direction). The first polarization direction is perpendicular to the third polarization direction, the first polarization direction and the second polarization direction have an included angle of 45°, and the second polarization direction and the third polarization direction have an included angle of 45°.

According to the embodiment of the present disclosure, the set of polarizing filters can further comprise fourth polarizing filters 4 and 44. A polarization direction of the fourth polarizing filters 4 and 44 is a fourth polarization direction (135° direction or −45° direction). The fourth polarization direction is perpendicular to the second polarization direction, the first polarization direction and the fourth polarization direction have an included angle of 45°, and the third polarization direction and the fourth polarization direction have an included angle of 45°.

According to the embodiment of the present disclosure, the set of polarizing filters can further comprise at least one of fifth polarizing filters 5 and 55, sixth polarizing filters 6 and 66, seventh polarizing filters 7 and 77, and eighth polarizing filters 8 and 88. A polarization direction of the fifth polarizing filters is the first polarization direction (horizontal direction), a polarization direction of the sixth polarizing filters is the second polarization direction (45° direction), a polarization direction of the seventh polarizing filters is the third polarization direction (vertical direction), and a polarization direction of the eighth polarizing filters is the fourth polarization direction (135° direction)

According to the embodiment of the present disclosure, the liveness authentication apparatus that applies the liveness authentication method according to the embodiment of the present disclosure further comprises one or more lenses. The set of polarizing filters can be arranged around a part of the one or more of lenses (for example, FIGS. 5A and 5B), or arranged on a part of the one or more of lenses (for example, FIGS. 5A-5D, FIGS. 6A-6B, and FIG. 7B and FIG. 7D can occupy the whole or part of lens area of a lens, or FIGS. 7A-7B can occupy a part of lens area of a lens), or arranged independent of the one or more lenses (for example, FIGS. 5A-5D, FIGS. 6A-6B, and FIGS. 7A-7D).

It shall be understood that the set of polarizing filters according to the embodiment of the present disclosure are not limited the number and form in FIGS. 3, 5A-5D, 6A-6B and 7A-7D. Those skilled in the art can design the number of the polarizing filters comprised in the set of polarizing filters as well as the layout form thereof according to the actual requirements.

Next, the liveness authentication apparatus according to an embodiment of the present disclosure would be described by referring to FIGS. 8-12.

FIG. 8 is a schematic structure diagram of a liveness authentication apparatus 800 according to an embodiment of the present disclosure.

The liveness authentication apparatus 800 according to an embodiment of the present disclosure comprises a set of polarizing filters 810, an optical-electrical converting device 820, and a processor 830.

The set of polarizing filters 810 is configured to receive incident light, and the set of polarizing filters are not overlapped with each other in a light transmission direction.

As an example, the set of polarizing filters is corresponding to at least two different polarization directions, and comprises at least two polarizing filters. In particular, for example, the set of polarizing filters can comprise a first polarizing filter and a second polarizing filter. A polarization direction of the first polarizing filter is a first polarization direction, and a polarization direction of the second polarizing filter is a second polarization direction. The first polarization direction and the second polarization direction can have an angle difference for example 30°, 45°, 60°, 90°, etc.

Further, in order to improve accuracy of the liveness authentication apparatus according to the embodiment of the present disclosure, the set of polarizing filters can correspond to at least three different polarization directions, and can comprise at least three polarizing filters. In particular, for example, the set of polarizing filters can comprise a first polarizing filter, a second polarizing filter and a third polarizing filter. A polarization direction of the first polarizing filter is a first polarization direction, a polarization direction of the second polarizing filter is a second polarization direction, and a polarization direction of the third polarizing filter is a third polarization direction. For example, the first polarization direction, the second polarization direction and the third polarization direction can have an angle difference for example 30°, 45°, 60°, 90°, etc. from each other in order.

The optical-electrical converting device 820 is configured to, for each of the set of polarizing filters, convert light transmitting through the polarizing filter into an electrical signal.

The optical-electrical converting device 820 can comprise a light-sensitive device and an analog-to-digital converter. The light-sensitive device is configured to, for each of the set of polarizing filters, convert light transmitting through the polarizing filter into an analog electrical signal, and the analog-to-digital converter is configured to convert the analog electrical signal into a digital electrical signal.

The processor 830 is configured to determine, for each of the set of polarizing filters, the intensity of the light transmitting through the polarizing filter according to the electrical signal corresponding to the polarizing filter, so as to obtain a set of light intensities corresponding to respective polarizing filters of the set of polarizing filters respectively, and determine that the liveness authentication is failed in the case that it is determined that the set of light intensities satisfy a predetermined condition.

As an example, the processor 830 can determine a maximum value and a minimum value of the set of light intensities, and in the case that a proportion of the minimum value and the maximum value is smaller than a first predetermined threshold, it is determined that the liveness authentication is failed. The first predetermined threshold is smaller than 1, and for example, the value of the first predetermined threshold may be within a range of 0.5-0.8. The first predetermined threshold can be determined according to experiments.

Alternatively, the processor 830 can determine the maximum value and the minimum value of the set of light intensities, and calculate a difference between the maximum value and the minimum value. In the case that a proportion of the difference and the maximum value is greater than a second predetermined threshold, it is determined that the liveness authentication is failed. The second predetermined threshold is smaller than 1, and for example, the value of the first predetermined threshold may be within a range of 0.2-0.5. The second predetermined threshold can be determined according to experiments.

As an example, according to the embodiment of the present disclosure, the set of polarizing filters can comprise first polarizing filters 1 and 11, second polarizing filters 2 and 22, and third polarizing filters 3 and 33. A polarization direction of the first polarizing filters 1 and 11 is a first polarization direction (horizontal direction), a polarization direction of the second polarizing filters 2 and 22 is a second polarization direction (45° direction), and a polarization direction of the third polarizing filters 3 and 33 is a third polarization direction (vertical direction). The first polarization direction is perpendicular to the third polarization direction, the first polarization direction and the second polarization direction have an included angle of 45°, and the second polarization direction and the third polarization direction have an included angle of 45°.

According to the embodiment of the present disclosure, the set of polarizing filters can further comprise fourth polarizing filters 4 and 44. A polarization direction of the fourth polarizing filters 4 and 44 is a fourth polarization direction (135° direction). The fourth polarization direction is perpendicular to the second polarization direction, the first polarization direction and the fourth polarization direction have an included angle of 45°, and the third polarization direction and the fourth polarization direction have an included angle of 45°.

According to the embodiment of the present disclosure, the set of polarizing filters can further comprise at least one of fifth polarizing filters 5 and 55, sixth polarizing filters 6 and 66, seventh polarizing filters 7 and 77, and eighth polarizing filters 8 and 88. A polarization direction of the fifth polarizing filters is the first polarization direction (horizontal direction), a polarization direction of the sixth polarizing filters is the second polarization direction (45° direction), a polarization direction of the seventh polarizing filters is the third polarization direction (vertical direction), a polarization direction of the eighth polarizing filters is the fourth polarization direction (135° direction)

In addition, the set of polarizing filters according to the embodiment of the present disclosure are not limited the number and form in FIGS. 3, 5A-5D, 6A-6B and 7A-7D. Those skilled in the art can design the number of the polarizing filters comprised in the set of polarizing filters as well as the layout form thereof according to the actual requirements.

Figure 9:
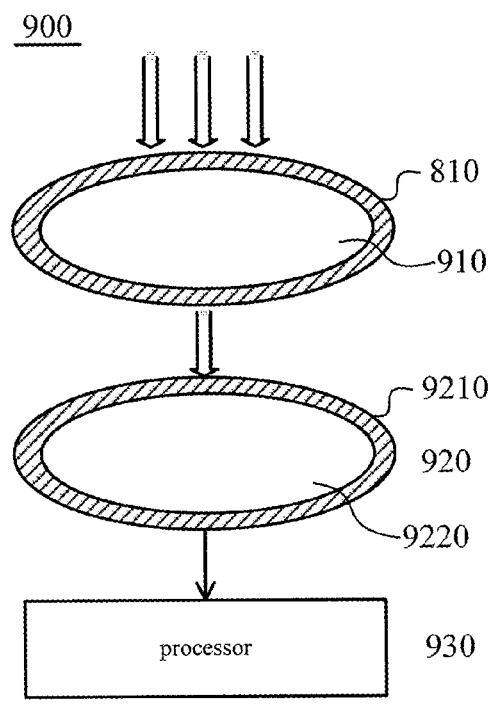
FIG. 9 is a schematic structure diagram of an implementation of a liveness authentication apparatus according to an embodiment of the present disclosure.

FIG. 9 is another schematic structure diagram of a liveness authentication apparatus 900 according to an embodiment of the present disclosure.

The liveness authentication apparatus 900 according to an embodiment of the present disclosure comprises a set of polarizing filters 810, a first lens 910, an optical-electrical converting device 920, and a processor 930.

The first lens 910 is configured to enable the optical-electrical converting device to capture an image of a scene within a predetermined photographing range.

The set of polarizing filters 810 are the same as the set of polarizing filters 810 as described in FIG. 8, and thus no further details is given herein.

In this embodiment, the set of polarizing filters 810 are coincided with a part of the first lens 910, and in particular can be integrated on the first lens 910 or superimposed on the first lens 910. For example, the set of polarizing filters as shown in FIGS. 5A-5B can be coincided with an outer circular ring part of the first lens 910 as shown in FIG. 9, while the set of polarizing filters as shown in FIGS. 5C-5D, 6A-6B and 7A-7D can occupy a part of the first lens (not shown).

As shown in FIG. 9, the optical-electrical converting device 920 comprises a first optical-electrical converting section 9210 and a second optical-electrical converting section 9220.

The part of the first lens 910 coincided with the set of polarizing filters 810 is corresponding to the first optical-electrical converting section 9210, and the part of the first lens 910 not coincided with the set of polarizing filters 810 is corresponding to the second optical-electrical converting section 9220.

The processor 930 produces an image signal based on an electrical signal produced by the first optical-electrical converting section 9210, and produces the set of light intensities based on electrical signals produced by the second optical-electrical converting section 9220. The image signal produced by the processor 930 based on the electrical signal produced by the first optical-electrical converting section 9210 is used for identity authentication based on human face.

Figure 10:
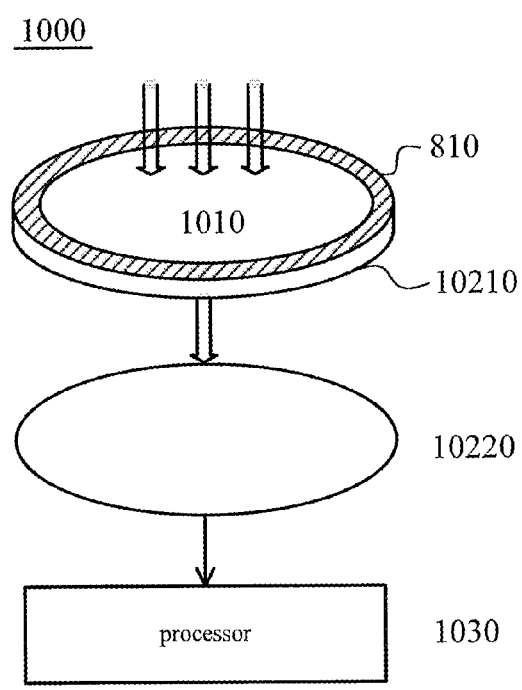
FIG. 10 is a schematic structure diagram of another implementation of a liveness authentication apparatus according to an embodiment of the present disclosure.

FIG. 10 is another schematic structure diagram of a liveness authentication apparatus 1000 according to an embodiment of the present disclosure.

The liveness authentication apparatus 1000 according to an embodiment of the present disclosure comprises a set of polarizing filters 810, a first lens 1010, an optical-electrical converting device and a processor 1030.

The set of polarizing filters 810 are the same as the set of polarizing filters 810 described in FIG. 8, and thus no further detail is given therein.

In this embodiment, the set of polarizing filters 810 can be arranged dependent of or independent of the first lens 1010. For example, the set of polarizing filters 810 as shown in FIGS. 5A-5B can be arranged outside and around the first lens 1010 as shown in FIG. 10, in particular, the set of polarizing filters 810 as shown in FIGS. 5A-5B nests the peripheral of the first lens 1010. The set of polarizing filters as shown in FIG. 5C-5D, 6A-6B or 7A-7D can be arranged outside the first lens 1010 dependent or independent of the first lens 1010 (not shown in the figure), and can be arranged close to the first lens 1010 or arranged having certain distance from the first lens 1010.

In this embodiment, the optical-electrical converting device comprises a first optical-electrical converting device 10210 and a second optical-electrical converting device 10220.

The set of polarizing filters 810 are corresponding to the first optical-electrical converting device 10210, which converts the light transmitting through the set of polarizing filters 810 into a first electrical signal, and the processor 1030 produces the set of light intensities based on the first electrical signal.

The first lens 1010 is corresponding to the second optical-electrical converting device 10220, which converts the light transmitting through the first lens 1010 into a second electrical signal, and the processor 1030 produces an image signal based on the second electrical signal, so as to be used for identity authentication based on human face.

Figure 11:
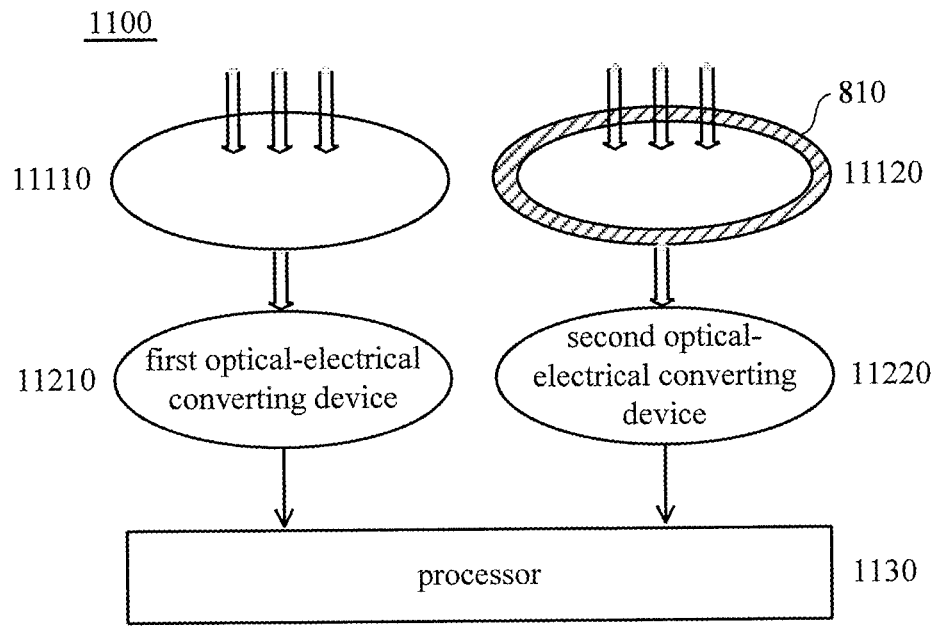
FIG. 11 is a schematic structure diagram of another implementation of a liveness authentication apparatus according to an embodiment of the present disclosure.

FIG. 11 is another schematic structure diagram of a liveness authentication apparatus 1100 according to an embodiment of the present disclosure.

The liveness authentication apparatus 1100 according to an embodiment of the present disclosure comprises a set of polarizing filters 810, a first lens 11110, a second lens 11120, an optical-electrical converting device, and a processor 1130.

The set of polarizing filters 810 are the same as the set of polarizing filters 810 described in FIG. 8, and thus no further detail is given therein.

In this embodiment, the set of polarizing filters 810 can be coincided with at least a part of the second lens 11120, and in particular can be integrated on the second lens 11120 or overlapped on the second lens 11120.

In this embodiment, the optical-electrical converting device comprises a first optical-electrical converting device 11210 and a second optical-electrical converting device 11220.

The first lens 11110 is configured to enable the first optical-electrical converting device 11210 to capture an image of a scene within a first predetermined photographing range.

The second lens 11120 is configured to enable the second optical-electrical converting device 11220 to capture an image of a scene within a second predetermined photographing range, wherein the first predetermined photographing range and the second predetermined photographing range are overlapped at least partially.

The first optical-electrical converting device 11210 converts light transmitting through the first lens 11110 into a first electrical signal, and the processor 1130 produces an image signal based on the first electrical signal, so as to be used for identity authentication of human face.

In the case that the set of polarizing filter 810 are overlapped with the entire area of the second lens 11120, the second optical-electrical converting device 11220 converts the light transmitting through the second lens 11120 into a second electrical signal, and the processor 1130 produces the set of light intensities based on the second electrical signal.

On the other hand, in the case that the set of polarizing filters 810 are overlapped with a part of lens area of the second lens 11120, the second optical-electrical converting device 11220 can comprise a first optical-electrical converting section and a second optical-electrical converting section.

The part of the second lens 11120 coincided with the set of polarizing filters 810 is corresponding to the first optical-electrical converting section of the second optical-electrical converting device 11220, and the part of the second lens 11120 not coincided with the set of polarizing filters 810 is corresponding to the second optical-electrical converting section of the second optical-electrical converting device 11220.

The processor 1130 produces the set of light intensities based on the electrical signal produced by the first optical-electrical converting section of the second optical-electrical converting device 11220, and produces the image signal based on the electrical signal produced by the second optical-electrical converting section of the second optical-electrical converting device 11220.

Figure 12:
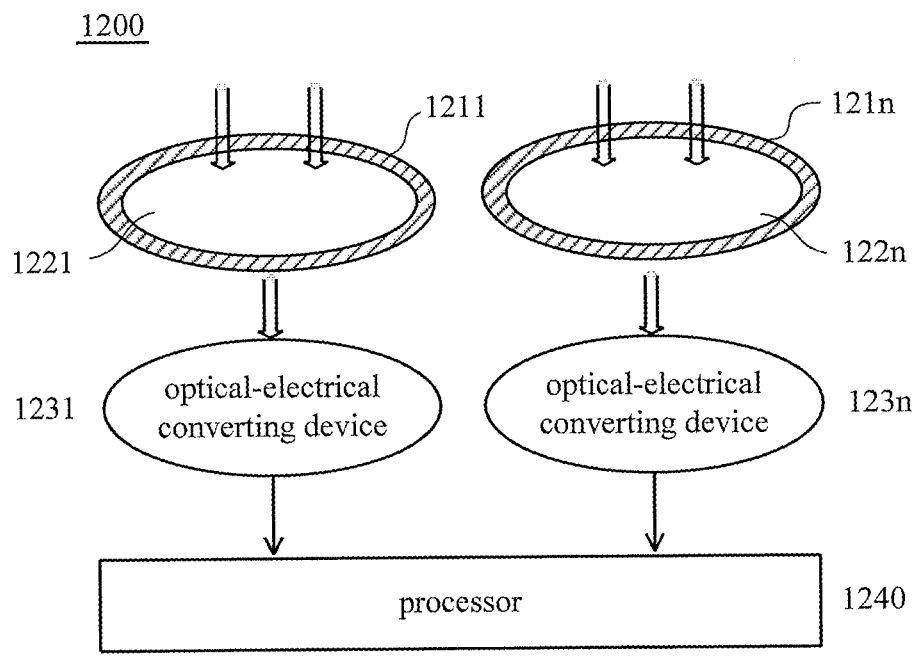
FIG. 12 is a schematic structure diagram of another implementation of a liveness authentication apparatus according to an embodiment of the present disclosure

FIG. 12 is another schematic structure diagram of a liveness authentication apparatus 1200 according to an embodiment of the present disclosure.

The liveness authentication apparatus 1200 according to an embodiment of the present disclosure comprises at least two sub-sets (i.e., n sub-sets) of polarizing filters 1211, ..., 121n, at least two lenses 1221, ..., 122n, and at least two optional-electrical converting devices 1231, ..., 123n, and a processor 1240. A sub-set of polarizing filters 121i is corresponding to one lens 122i and one optional-electrical converting device 123i.

Each sub-set of polarizing filters 121i comprises at least one polarizing filter. And the at least two sub-sets of polarizing filters 1211, ..., 121n provide at least two polarizing directions, and each sub-set of polarizing filters 121i provides at least one polarization direction. Advantageously, the at least two sub-sets of polarizing filters 1211, ..., 121n provide at least three polarization directions.

Each lens 122i is corresponding to a sub-set of polarizing filters 121i. The sub-set of polarizing filters 121i is coincided with a part of the lens 122i, and in particular can be integrated on the lens 122i or superposed on the lens 122i. In addition, each lens 122i is corresponding to one optional-electrical converting device 123i.

Each optional-electrical converting device 123i comprises a first optical-electrical converting section and a second optical-electrical converting section.

The part of each lens 122i that is coincided with its corresponding sub-set of polarizing filters 121i is corresponding to the first optical-electrical converting section of its corresponding optional-electrical converting device 123i, and the part of each lens 122i that is not coincided with its corresponding sub-set of polarizing filters 121i is corresponding to the second optical-electrical converting section of its corresponding optional-electrical converting device 123i.

As an example, the area of the part of each lens 122i that is coincided with its corresponding sub-set of polarizing filters 121i is the same or different, the area of each sub-set of polarizing filters 121i is the same or different, and the number of polarizing filters provided by each sub-set of polarizing filters 121i is the same or different.

Optionally, for example, the liveness authentication apparatus comprises a first lens, a second lens, a first sub-set of polarizing filters covering the first lens, and a second sub-set of polarizing filters covering the second lens. The first sub-set of polarizing filters comprises first and second polarizing filters, and the second sub-set of polarizing filters comprises third and fourth polarizing filters. A polarization direction of the first polarizing filter is the horizontal direction, a polarization direction of the second polarizing filter is 45° direction in the first quadrant, a polarization direction of the third polarizing filter is the vertical direction, and a polarization direction of the fourth polarizing filter is 45° direction in the fourth quadrant.

The processor 1240 determines the intensities of lights transmitting through the respective polarizing filters as a set of light intensities based on the electrical signals produced by the first optical-electrical converting section in each optional-electrical converting device 123i, and determines whether the incident light is linear polarized light according to the set of light intensities.

The processor 1240 generates an image signal based on the electrical signals produced by the second optical-electrical converting section in each optional-electrical converting device 123i, for example, beings used for identity recognition based on human face.

In addition, the processors 830, 930, 1030, 1130 and 1230 according to the embodiments of the present disclosure can not only be implemented as one or more general processors, but also can be implemented by utilizing a single chip microcomputer, a microprocessor, a digital signal processor, a specific image processing chip, and a field programmable logic array and so on.

According to the embodiments of the present disclosure, based on the display characteristics of the liquid crystal display screen, it is detected whether the incident light is the linear polarized light through making the incident light incident to the plurality of polarizing filters and detecting the intensities of light transmitting through the respective polarizing filters, thus correspondingly identifying whether the incident light is the light emitted from the liquid crystal display screen. In the case that it is determined the incident light is the light emitted from the liquid crystal display screen, it can be determined that the attack of screen display is detected, that is, the liveness authentication is failed.

It should be understood that, according to the embodiments of the present disclosure, even if the liveness authentication is passed, it does not mean that there is certainly a liveness. The liveness authentication method and apparatus according to the embodiments of the present disclosure are just one aspect of performing the liveness authentication in the human face recognition system, and aims at resisting the attack from the photo display, video display or flash display from the liquid crystal display screen.

Although exemplary embodiments are already described herein by referring to the accompanying drawings, it shall be understood that the above exemplary embodiments are just for illustration, and do not intend to limit the scope of the present disclosure thereto. Those ordinary skilled in the art can make various alternations and amendments without departing from the scope and spirit of the present disclosure. All these alternations and amendments intend to be included in the scope of the present disclosure claimed in the Claims.

What is claimed is:

1. A liveness authentication method, comprising:
    making incident light incident to a set of polarizing filters, the set of polarizing filters being not overlapped with each other in a light transmission direction;
    detecting, for each of the set of polarizing filters, an intensity of light transmitting through the polarizing filter, so as to obtain a set of light intensities corresponding to respective polarizing filters of the set of polarizing filters respectively; and
    determining that the liveness authentication is failed in the case that the set of light intensities satisfy a predetermined condition.

2. The liveness authentication method according to claim 1, wherein the set of polarizing filters are corresponding to at least three different polarization directions and comprise at least three polarizing filters.

3. The liveness authentication method according to claim 2, wherein said determining that the liveness authentication is failed in the case that the set of light intensities satisfy a predetermined condition comprises:

determining a maximum value and a minimum value of the set of light intensities, and determining that the liveness authentication is failed in the case that a proportion of the minimum value and the maximum value is smaller than a first predetermined threshold; or determining the maximum value and the minimum value of the set of light intensities, calculating a difference between the maximum value and the minimum value, and determining that the liveness authentication is failed in the case that a proportion of the difference and the maximum value is greater than a second predetermined threshold.

4. The liveness authentication method according to claim 2, wherein the set of polarizing filters comprise a first polarizing filter, a second polarizing filter and a third polarizing filter, wherein a polarization direction of the first polarizing filter is a first polarization direction, a polarization direction of the second polarizing filter is a second polarization direction, and a polarization direction of the third polarizing filter is a third polarization direction, the first polarization direction is perpendicular to the third polarization direction, the first polarization direction and the second polarization direction have an included angle of 45°, and the second polarization direction and the third polarization direction have an included angle of 45°.

5. The liveness authentication method according to claim 4, wherein the set of polarizing filters further comprises a fourth polarizing filter, a polarization direction of the fourth polarizing filter is a fourth polarization direction, the fourth polarization direction is perpendicular to the second polarization direction, the first polarization direction and the fourth polarization direction have an included angle of 45°, and the third polarization direction and the fourth polarization direction have an included angle of 45°.

6. The liveness authentication method according to claim 5, wherein the set of polarizing filters further comprises at least one of a fifth polarizing filter, a sixth polarizing filter, a seventh polarizing filter, and an eighth polarizing filter, a polarization direction of the fifth polarizing filter is the first polarization direction, a polarization direction of the sixth polarizing filter is the second polarization direction, a polarization direction of the seventh polarizing filter is the third polarization direction, and a polarization direction of the eighth polarizing filter is the fourth polarization direction.

7. The liveness authentication method according to claim 2, wherein the at least three polarizing filters are arranged around a lens, or arranged on the lens, or arranged independent of the lens.

8. A liveness authentication apparatus, comprising:
   a set of polarizing filters configured to receive incident light, the set of polarizing filters being not overlapped with each other in a light transmission direction;
   an optical-electrical converting device configured to, for each of the set of polarizing filters, convert light transmitting through the polarizing filter into an electrical signal; and
   a processor configured to determine, for each of the set of polarizing filters, the intensity of the light transmitting through the polarizing filter according to the electrical signal corresponding to the polarizing filter, so as to obtain a set of light intensities corresponding to respective polarizing filters of the set of polarizing filters respectively, and determine that the liveness authentication is failed in the case that it is determined the set of light intensities satisfy a predetermined condition.

9. The liveness authentication apparatus according to claim 8, wherein the set of polarizing filters are corresponding to at least three different polarization directions and comprise at least three polarizing filters.

10. The liveness authentication apparatus according to claim 9, wherein
   the optical-electrical converting device comprises a light-sensitive device and an analog-to-digital converter, wherein the light-sensitive device is configured to convert the light transmitting through the set of polarizing filters into an analog signal and the analog-to-digital converter is configured to convert the analog signal into a digital signal.

11. The liveness authentication apparatus according to claim 9, wherein the processor determines that the liveness authentication is failed in the case that it is determined the set of light intensities satisfy a predetermined condition comprises:
   the processor determines a maximum value and a minimum value of the set of light intensities, and determines that the liveness authentication is failed in the case that a proportion of the minimum value and the maximum value is smaller than a first predetermined threshold; or
   the processor determines the maximum value and the minimum value of the set of light intensities, calculates a difference between the maximum value and the minimum value, and determines that the liveness authentication is failed in the case that a proportion of the difference and the maximum value is greater than a second predetermined threshold.

12. The liveness authentication apparatus according to claim 9, wherein the set of polarizing filters comprise a first polarizing filter, a second polarizing filter and a third polarizing filter, wherein a polarization direction of the first polarizing filter is a first polarization direction, a polarization direction of the second polarizing filter is a second polarization direction, and a polarization direction of the third polarizing filter is a third polarization direction, the first polarization direction is perpendicular to the third polarization direction, the first polarization direction and the second polarization direction have an included angle of 45°, and the second polarization direction and the third polarization direction have an included angle of 45°.

13. The liveness authentication apparatus according to claim 12, wherein the set of polarizing filters further comprise a fourth polarizing filter, a polarization direction of the fourth polarizing filter is a fourth polarization direction, the fourth polarization direction is perpendicular to the second polarization direction, the first polarization direction and the fourth polarization direction have an included angle of 45°, and the third polarization direction and the fourth polarization direction have an included angle of 45°.

14. The liveness authentication apparatus according to claim 13, wherein the set of polarizing filters further comprise at least one of a fifth polarizing filter, a sixth polarizing filter, a seventh polarizing filter, and an eighth polarizing filter, a polarization direction of the fifth polarizing filter is the first polarization direction, a polarization direction of the sixth polarizing filter is the second polarization direction, a polarization direction of the seventh polarizing filter is the third polarization direction, and a polarization direction of the eighth polarizing filter is the fourth polarization direction.

15. The liveness authentication apparatus according to claim 8, furthering comprising:

a first lens configured to enable the optical-electrical converting device to capture an image of a scene within a predetermined photographing range.

16. The liveness authentication apparatus according to claim 15, wherein the set of polarizing filters are overlapped with a part of the first lens,
wherein the optical-electrical converting device comprises a first optical-electrical converting section and a second optical-electrical converting section, the part of the first lens coincided with the set of polarizing filters is corresponding to the first optical-electrical converting section, and the processor produces an image signal based on an electrical signal produced by the first optical-electrical converting section; and the part of the first lens not coincided with the set of polarizing filters is corresponding to the second optical-electrical converting section, and the processor produces the set of light intensities based on an electrical signal produced by the second optical-electrical converting section.

17. The liveness authentication apparatus according to claim 15, wherein the set of polarizing filters are arranged outside the first lens, wherein the optical-electrical converting device comprises a first optical-electrical converting device and a second optical-electrical converting device,
the set of polarizing filters are corresponding to the first optical-electrical converting device, which converts the light transmitting through the set of polarizing filters into a first electrical signal, and the processor produces the set of light intensities based on the first electrical signal;
the first lens is corresponding to the second optical-electrical converting device, which converts the light transmitting through the first lens into a second electrical signal, and the processor produces an image signal based on the second electrical signal.

18. The liveness authentication apparatus according to claim 15, wherein the optical-electrical converting device comprises a first optical-electrical converting device and a second optical-electrical converting device; the first lens is configured to enable the first optical-electrical converting device to capture an image of a scene within a first predetermined photographing range;
the liveness authentication apparatus further comprises: a second lens configured to enable the second optical-electrical converting device to capture an image of a scene within a second predetermined photographing range, wherein the first predetermined photographing range is overlapped with at least a part of the second predetermined photographing range, and the set of polarizing filters are coincided with at least a part of the second lens,
wherein the second optical-electrical converting device converts the light transmitting through the part of the second lens coincided with the set of polarizing filters into a second electrical signal, and the processor produces the set of light intensities based on the second electrical signal.

19. The liveness authentication apparatus according to claim 8, further comprising at least two lenses,
wherein the set of polarizing filters comprises at least two sub-sets of polarizing filters, and the optical-electrical converting device comprises at least two optical-electrical converting devices,
the at least two lenses, the at least two sub-sets of polarizing filters and the at least two optical-electrical converting devices are corresponding one by one,
each sub-set of polarizing filters of the at least two sub-sets of polarizing filters are coincided with at least a part of lens corresponding thereto,
each optical-electrical converting device converts the light transmitting through the part of its corresponding lens coincided with the sub-set polarizing filter into a first electrical signal, and
the processor determines intensities of the light transmitting through respective polarizing filters of the set of polarizing filters as the set of light intensities based on the first electrical signal produced by each optical-electrical converting device.

20. The liveness authentication apparatus according to claim 8, wherein
the set of polarizing filters are arranged as a ring shape structure comprising at least one ring, and each polarizing filter is composed of at least an arc in the ring shape structure; or
each of the set of polarizing filters is arranged as a fan-shaped structure; or
the set of polarizing filters are arranged as a matrix form; or
each of the set of polarizing filters is arranged as a rectangle.

* * * * *